US 12,554,832 B2

(12) United States Patent
Mishina

(10) Patent No.: US 12,554,832 B2
(45) Date of Patent: Feb. 17, 2026

(54) AUTOMATED LEAST PRIVILEGE ASSIGNMENT

(71) Applicant: INTERNATIONAL BUSINESS MACHINES CORPORATION, Armonk, NY (US)

(72) Inventor: Takuya Mishina, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 272 days.

(21) Appl. No.: 18/183,479

(22) Filed: Mar. 14, 2023

(65) Prior Publication Data
US 2024/0311468 A1 Sep. 19, 2024

(51) Int. Cl.
*G06F 21/52* (2013.01)
*G06F 9/46* (2006.01)
*G06F 21/60* (2013.01)

(52) U.S. Cl.
CPC .............. *G06F 21/52* (2013.01); *G06F 9/468* (2013.01); *G06F 21/604* (2013.01); *G06F 2221/2141* (2013.01)

(58) Field of Classification Search
CPC ........ G06F 21/52; G06F 9/468; G06F 21/604; G06F 2221/2141
USPC .......................................................... 726/2
See application file for complete search history.

(56) References Cited

U.S. PATENT DOCUMENTS

| 8,726,392 | B1 * | 5/2014 | McCorkendale | ....... G06F 21/52 713/188 |
| 9,749,349 | B1 * | 8/2017 | Czarny | ............... H04L 63/1425 |
| 10,803,166 | B1 | 10/2020 | Terkowitz | |
| 11,095,506 | B1 * | 8/2021 | Erblat | ................. H04L 41/5058 |
| 2011/0083069 | A1 * | 4/2011 | Paul | .................... H04N 21/2393 715/234 |
| 2020/0342449 | A1 * | 10/2020 | Lai | ...................... G06F 16/2379 |
| 2020/0410115 | A1 | 12/2020 | Marinov | |
| 2021/0084040 | A1 | 3/2021 | Sakowicz | |

(Continued)

FOREIGN PATENT DOCUMENTS

CN 114465807 B * 7/2023 ............. H04L 63/20

OTHER PUBLICATIONS

Khalid, "Built Kubernetes? Now Try These 5 RBAC Tools to Audit Permissions," Geekflare, Oct. 31, 2022, 11 pages.

(Continued)

*Primary Examiner* — Lynn D Feild
*Assistant Examiner* — Saad Ahmad Abdullah
(74) *Attorney, Agent, or Firm* — Stosch Sabo

(57) ABSTRACT

Described are techniques for automated least privilege role definition. The techniques include enumerating access patterns including a subject, a verb, an object location, and an object type of respective Application Programming Interface (API) calls in source code associated with a binary program. For a first function call in the source code, the technique is configured to generate a first object type based on an API definition associated with the function call, a first verb based on an API-to-verb matching database, a first subject based on a program-to-subject mapping database and the binary program, and a first object location based on the API definition associated with the function call. The technique further includes generating a Role Based Access Control (RBAC) role definition based on the enumerated access patterns.

20 Claims, 8 Drawing Sheets

(56) References Cited

U.S. PATENT DOCUMENTS

| | | |
|---|---|---|
| 2021/0097477 A1* | 4/2021 | Zhang .................... G01N 21/90 |
| 2021/0329003 A1 | 10/2021 | Segal |
| 2022/0237290 A1* | 7/2022 | Villegas ................. G06F 21/64 |
| 2023/0094856 A1* | 3/2023 | Ithal ...................... H04L 63/102 |
| | | 726/4 |
| 2024/0098090 A1* | 3/2024 | Haddad ................ H04L 63/105 |

OTHER PUBLICATIONS

Shimizu et al., "Test-Based Least Privilege Discovery on Cloud Infrastructure as Code," 2020 IEEE International Conference on Cloud Computing Technology and Science (CloudCom), 2020, pp. 1-8.

* cited by examiner

```
instruction <*ssa.Call>: invoke t31.Create(t33, nil|]algs.k8s.io/controller-
runtime/pkg/client.CreateOption...),...
...
call arg: context.TODO() (*ssa.Call) (context.Context) pos=/Users/taishi.ba/workspace/cloud-
compliance/compliance-operator-origin/cmd/manager/resultcollector.go:366:42
call arg: make k8s.io/apimachinery/pkg/runtime.Object <- *k8s.io/api/core/v1.ConfigMap (t29)
(*ssa.MakeInterface) (k8s.io/apimachinery/pkg/runtime.Object) pos=—
```
← 502

```
instruction <*ssa.Call>: github.com/openshift/compliance-operator/pkg/utils.GetResultConfigMap(t27, t15, "error-
msg":string, t18, t21, t24, t25, t26], string=github.com/openshift/compliance-
operator/pkg/utils.GetResultConfigMap(t27, t15, "error-msg":string, t18, t21, t24, t25, t26)
SSA Value name: t29
```
← 504

```
instruction <*ssa.Alloc>: new k8s.io/api/core/v1.ConfigMap (complie), string=new k8s.io/api/core/v1.ConfigMap
(complie)
SSA Value name: t10
...
instruction <*ssa.FieldAddr>: &t10.ObjectMeta [#1], string=&t10.ObjectMeta [#1]
SSA Value name: t14
Type: *k8s.io/apimachinery/pkg/apis/meta/v1.ObjectMeta
...
instruction <*ssa.FieldAddr>: &t14.Namespace [#2], string=&t14.Namespace [#0]
SSA Value name: t16
```
← 506

```
instruction <*ssa.Store>: *t16 = t17, string=*t16 = t17
```
← 508

FIG. 5

```
instruction <*ssa.Call>: github.com/openshift/compliance-
operator/pkg/controller/common.GetComplianceOperatorNamespace(), string:github.com/openshift/compliance-   ← 602
operator/pkg/controller/common.GetComplianceOperatorNamespace()
SSA Value name: t17 unop: *complianceOperatorNamespace, op=*, x=github.com/openshift/compliance-                               ← 604
operator/pkg/controller/common.complianceOperatorNamespace
instruction <*ssa.Return>: return t0, string:return t0 func init() {                                                                                              ← 606
    ...
    if isRunModeLocal() {
        ns, ok := os.LookupEnv("OPERATOR_NAMESPACE")
        if ok {
            complianceOperatorNamespace = ns
        } else {
            ns, ok := os.LookupEnv("WATCH_NAMESPACE")
            if ok {
                complianceOperatorNamespace = ns
            }
        }
    } else {
        nsBytes, err := ioutil.ReadFile("/var/run/secrets/kubernetes.io/serviceaccount/namespace")
        if err != nil {
            return
        }
        complianceOperatorNamespace = strings.TrimSpace(string(nsBytes))
    }
}
```

FIG. 6

```
apiVersion: v1
kind: Pod
metadata:
  ...
  name: compliance-operator-7446c747d-qgvjh
  namespace: openshift-compliance
  ...
spec:
  containers:
  - env:
    - name: WATCH_NAMESPACE
      valueFrom:
        fieldRef:
          apiVersion: v1
          fieldPath: metadata.namespace     # <-- metadata.namespace is openshift-compliance
  ...
  serviceAccountName: compliance-operator   # <-- this means the namespace of this pod, which is openshift-compliance
```

AUTOMATED LEAST PRIVILEGE ASSIGNMENT

BACKGROUND

The present disclosure relates to cybersecurity, and, more specifically, to implementing access controls by automated least privilege assignments.

Programs executed on a cloud infrastructure run with certain privileges (e.g., a pod implemented in a KUBERNETES® infrastructure). However, additional steps are needed to ensure reasonable levels of security on the cloud infrastructure. First, distinct security boundaries can be applied to each application in order to mitigate confidential information leakage between applications (e.g., the namespace functionality provided by KUBERNETES®). Second, each application can be segmented into appropriate program groups (e.g., the ServiceAccounts functionality provided by KUBERNETES®). Third, individual roles can be defined, and privilege sets (e.g., access controls) assigned to each role. Fourth, roles and program groups can be bound together in order to transfer privileges to each program group.

Aspects of the present disclosure are directed toward the third security related step discussed above, namely, defining individual roles and assigning a privilege set to each defined role. However, it can be difficult to accurately and efficiently define individual roles and assign appropriate privilege sets to each defined role. If insufficient privileges are provided, a program may fail. As a result, developers typically assign larger privilege access controls than is necessary to avoid program failures. Unfortunately, unnecessarily broad privileges increase security risks. To address this, some cybersecurity standards (e.g., National Institute of Standards and Technology (NIST) Special Publication (SP) 800-53, Health Insurance Portability and Accountability Act (HIPAA), Payment Card Industry Data Security Standard (PCI-DSS), etc.) require least privilege access controls.

However, existing solutions for defining least privilege access controls have various drawbacks. One solution utilizes test-based automated assignments. However, such test-based solutions can overlook some necessary privileges (e.g., a false negative) that may be required for occasional (e.g., untested) operations. Another solution determines required permissions by visualizing relationships between different access privileges. However, visualizing access privilege relationships requires developers to manually assign appropriate privileges. As a result, current solutions for least-privilege security controls can be inefficient to generate and inaccurate once created.

SUMMARY

Aspects of the present disclosure are directed toward a computer-implemented method including enumerating access patterns including a subject, a verb, an object location, and an object type of respective Application Programming Interface (API) calls in source code associated with a binary program. For a first function call in the source code the method is configured to generate a first object type based on an API definition associated with the function call, a first verb based on an API-to-verb matching database, a first subject based on a program-to-subject mapping database and the binary program, and a first object location based on the API definition associated with the function call. The method further includes generating a Role Based Access Control (RBAC) role definition based on the enumerated access patterns.

Advantageously, the aforementioned method automates least-privilege role definition. More specifically, the aforementioned method defines an RBAC role definition based on subjects, verbs, object locations, and object types automatically detected in source code.

Additional aspects of the present disclosure including the aforementioned method further include that the first object location is a null object location, and the null object location is set to a location of a corresponding binary program using runtime analysis. Advantageously, these aspects of the present disclosure utilize runtime analysis to identify an object location for a null object location (e.g., a non-deterministic location). Accordingly, these aspects of the present disclosure combine static analysis with runtime analysis to comprehensively enumerate needed accesses for an accurate least-privilege role definition.

Additional aspects of the present disclosure are directed toward a system including an Application Programming Interface (API) definition characterizing respective object types and object locations of respective API calls. The system further includes an API-to-verb mapping database characterizing respective verbs of respective API calls. The system further includes a program-to-subject mapping database characterizing respective subjects of respective API calls. The system further includes an automatic privilege assignor storing access patterns including a subject, a verb, an object location, and an object type of respective API calls in source code associated with a binary program, where the automatic privilege assignor is configured to generate a Role Based Access Control (RBAC) role definition based on the access patterns.

Advantageously, the aforementioned system automates least-privilege role definition. More specifically, the aforementioned method defines an RBAC role definition based on subjects, verbs, object locations, and object types automatically detected in source code.

Additional aspects of the present disclosure including the aforementioned system further include that a first object location is a null object location, and the null object location is set to a location of the binary program using runtime analysis. Advantageously, these aspects of the present disclosure utilize runtime analysis to identify an object location for a null object location (e.g., a non-deterministic location). Accordingly, these aspects of the present disclosure combine static analysis with runtime analysis to comprehensively enumerate needed accesses for an accurate least-privilege role definition.

Additional aspects of the present disclosure are directed to systems and computer program products configured to perform the method described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

FIGS. 5, 6, and 7 illustrate example code snippets demonstrating how some aspects of the present disclosure are implemented in a KUBERNETES® application implemented on a KUBERNETES® API server, in accordance with some embodiments of the present disclosure.

Figure 1:
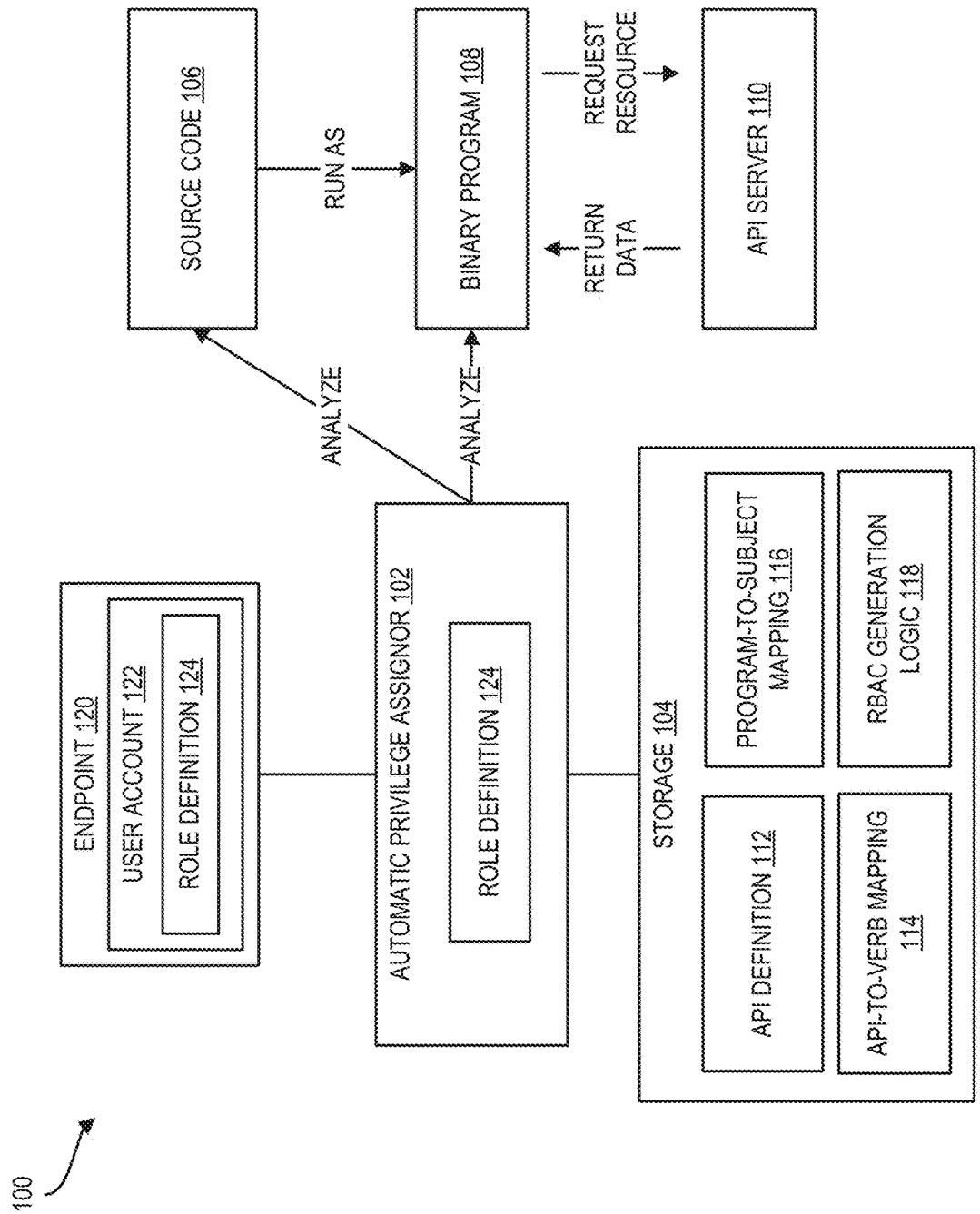
FIG. 1 illustrates a block diagram of an example computational environment implementing an automatic privilege assignor, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward cybersecurity, and, more specifically, to implementing access controls by automated least privilege assignments. While not limited to such applications, embodiments of the present disclosure may be better understood in light of the aforementioned context.

Aspects of the present disclosure are directed toward automatically determining a necessary and sufficient set of privilege tuples (e.g., {verb, type, location}) for each user group. In the context of a KUBERNETES® implementation, a privilege can be envisioned as a "read" access (e.g., verb) to "configmap" resources (e.g., type) in "purchase-app" namespace (e.g., location) for each "ServiceAccount". In some implementations, a user can specify names of functions for each verb. A developer can assign a separate namespace for each application. Further, a developer can assign an appropriate user group (e.g., "ServiceAccount") for each program (e.g., pod) in an application. Aspects of the present disclosure can then perform static analysis to enumerate access patterns (e.g., subject, verb, object location, and object type) found in source code. If any object location cannot be determined in static analysis, aspects of the present disclosure can perform a runtime analysis to define the undetermined object location. The enumerated access patterns (whether detected by static analysis or runtime analysis) can then be used to generate a role definition including all needed privileges and no unnecessary privileges (e.g., least-privilege).

In this way, aspects of the present disclosure can perform automated and accurate privilege assignment, thereby relieving developers of (i) learning an access control mechanism of a given infrastructure, and (ii) defining appropriate privilege assignments. Furthermore, static analysis can reduce false negatives (e.g., likely to zero) by comprehensively evaluating all possible API calls (both direct and indirect), thereby increasing the security posture of the application and infrastructure by avoiding overly broad privilege assignments.

Referring now to the figures, FIG. 1 illustrates a block diagram of an example computational environment 100 implementing an automatic privilege assignor 102, in accordance with some embodiments of the present disclosure. The automatic privilege assignor 102 can be a combination of hardware (e.g., processing resources, storage resources, and/or networking resources) and/or software. The automatic privilege assignor 102 can be implemented on a set of client-owned physical computing resources, or the automatic privilege assignor 102 can be implemented on virtualized computing resources vended to the client from a cloud provider, for example. In some embodiments, the automatic privilege assignor 102 can be a computer (e.g., computer 801 of FIG. 1) implementing code (e.g., role definition generation code 846 of FIG. 8).

The automatic privilege assignor 102 can be configured to automatically generate a role definition 124 representing a necessary and sufficient set of privileges for a user account 122. The automatic privilege assignor 102 can analyze source code 106 (e.g., Go, PYTHON®, etc.) and a binary program 108 (e.g., a KUBERNETES® pod, a PYTHON® application, etc.) functioning as a runtime implementation of the source code 106. The binary program 108 can interact with an API server 110. The API server 110 can service resource requests with returned data (or a returned error code).

The automatic privilege assignor 102 can interface with storage 104 storing an API definition 112, an API-to-verb mapping 114, a program-to-subject mapping 116, and Role Based Access Control (RBAC) generation logic 118. Any of the aforementioned components can be stored in storage 104 using data structures now known or later developed such as, but not limited to, databases, lists, vectors, matrices, tensors, executable computer-readable program code, and the like.

API definition 112 can contain names (e.g., subjects) and argument processing logic for functions that perform calls (e.g., to API server 110). API-to-verb mapping 114 details relationships between functions and verbs (e.g., the function "get( )" can be mapped to the verb "read," the function "delete( )" can be mapped to the verb "write", and so on). Program-to-subject mapping 116 can be a database or logic capable of identifying a subject based on a binary program 108. Finally, RBAC generation logic 118 can be configured to convert data generated by the automatic privilege assignor 102 to a role definition 124. More specifically, RBAC generation logic 118 can convert data in the form of {subject, verb, object} or {subject, verb, object type, object location} into the role definition 124.

The role definition 124 can be applied to a user account 122. The user account can be implemented on an endpoint 120 such as a computer, laptop, tablet, smartphone, or the like. The endpoint 120, at the direction of the user account 122, can interact with the source code 106 (or a runtime instance such as the binary program 108) according to constraints defined by the role definition 124.

FIG. 1 is illustrative and more, fewer, or different components than the components shown in FIG. 1 can exist in other embodiments. Further, multiple components of FIG. 1 can be combined together, and/or individual components of FIG. 1 can be separated and distributed, in accordance with various embodiments of the present disclosure.

Figure 2:
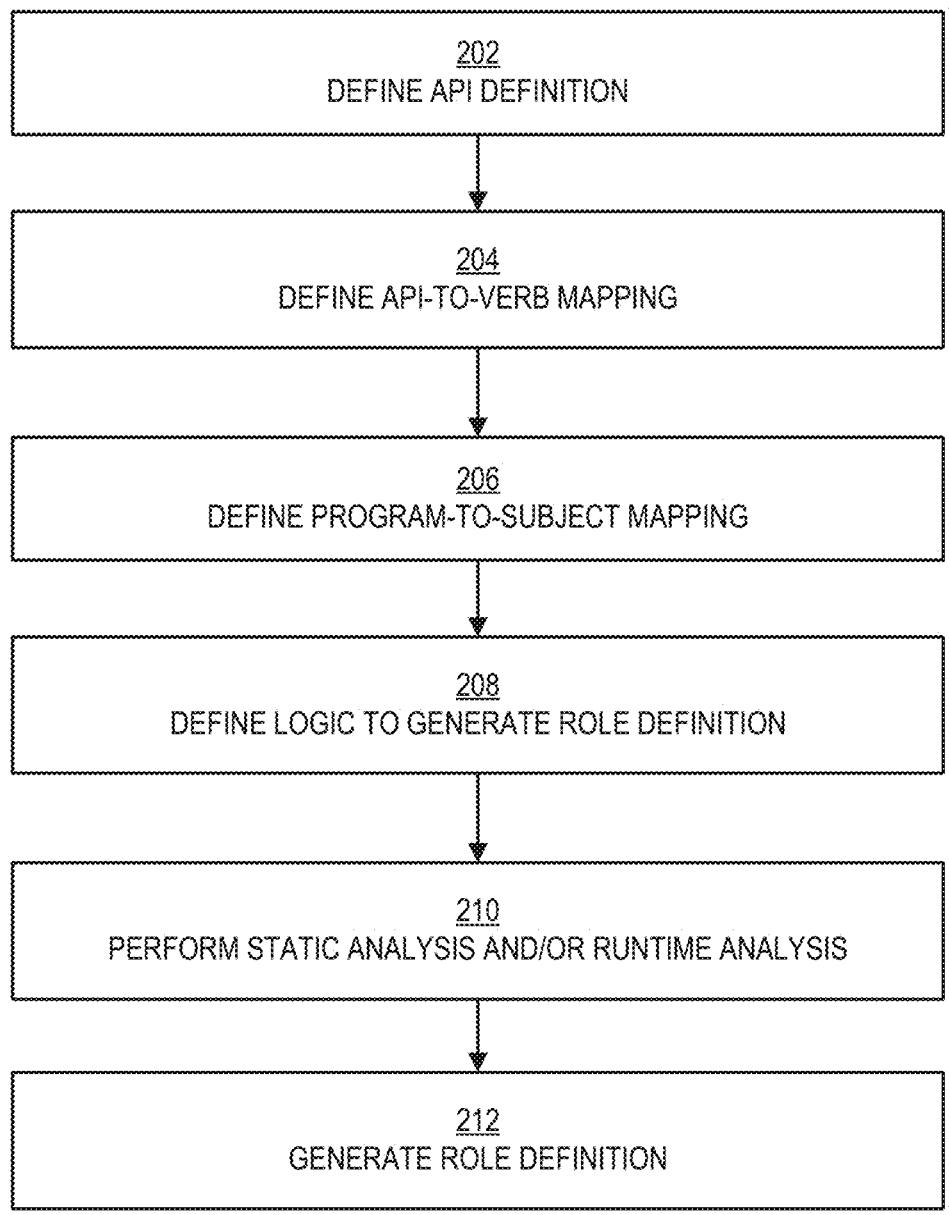
FIG. 2 illustrates a flowchart of an example method for generating a role definition using an automatic privilege assignor, in accordance with some embodiments of the present disclosure.

FIG. 2 illustrates a flowchart of an example method 200 for generating a role definition using an automatic privilege assignor, in accordance with some embodiments of the present disclosure. In some embodiments, the method 200 can be implemented by a computer, a processor, or another configuration of hardware and/or software. In some embodiments, the method 200 is implemented by one or more components of FIG. 1 (e.g., automatic privilege assignor 102 of FIG. 1) and/or FIG. 8 (e.g., computer 801 of FIG. 8).

Operation 202 includes defining an API definition. The API definition can include names and processing logic of functions that access a target API.

Operation 204 includes defining an API-to-verb mapping. The API-to-verb mapping can map functions of the API (e.g., get( ) post( ) put( ) patch( ) delete( ) etc.) to verbs reflecting access levels (e.g., read, write, view, edit, etc.).

Operation 206 includes defining a program-to-subject mapping. The program-to-subject mapping can map binary programs to subjects.

Operations 202, 204, and/or 206 can be performed based on any behavior analysis method, user input, and/or machine learning (ML). When ML is used, ML models can be generated from historical datasets of API definitions, API-to-verb mappings, and/or program-to-subject mappings, and the trained ML model can be configured to ingest source code and/or a binary program and output an API definition, an API-to-verb mapping, and/or a program-to-subject mapping. ML algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the ML algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multi-dimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other ML techniques.

Operation 208 includes defining logic to generate a role definition from information in the form {subject, verb, object} or {subject, verb, object type, object location}. In some embodiments, operation 208 defines logic to generate a role definition that encompasses sufficient access to perform each of the enumerated access patterns (e.g., in the form of {subject, verb, object} or {subject, verb, object type, object location}) and no further access. In this way, aspects of the present disclosure can automatically generate role definitions that include each necessary privilege and no other privileges (e.g., least privilege).

Operation 210 includes performing static analysis and/or runtime analysis. Static analysis can be performed on source code while runtime analysis can be performed on a binary program. Operation 210 can enumerate access patterns from API calls (both direct API calls and indirect API calls) and use the enumerated access patterns to define a role definition. Static analysis can be useful for enumerating a majority of access patterns while runtime analysis can be used for situations where an object location parameter is non-deterministic (e.g., the object location is given as a command line argument or an environmental parameter). In these situations, the runtime analysis can enable the object location to be set as the location of the binary program.

Operation 212 includes generating a role definition based on the results of operation 210. Advantageously, the role definition is an automatically generated least-privilege role definition. Furthermore, the role definition is highly accurate insofar as the privilege set is derived from the source code. In some embodiments, operation 212 includes assigning the role definition to one or more user accounts.

Figure 3:
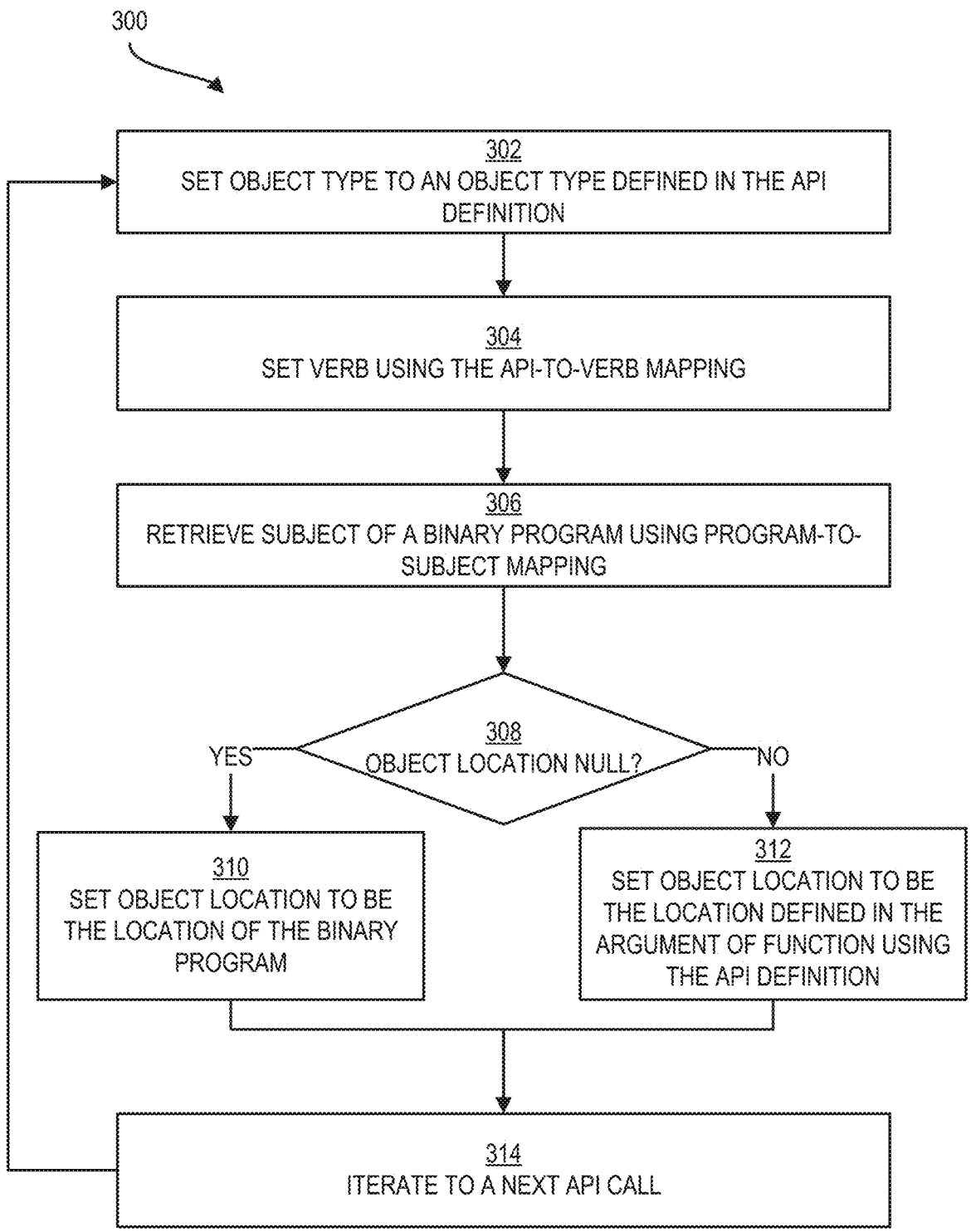
FIG. 3 illustrates a flowchart of an example method for defining a subject, a verb, an object type, and an object location for respective API calls in source code, in accordance with some embodiments of the present disclosure.

FIG. 3 illustrates a flowchart of an example method 300 for defining a subject, a verb, an object type, and an object location for respective API calls in source code, in accordance with some embodiments of the present disclosure. In some embodiments, the method 300 can be implemented by a computer, a processor, or another configuration of hardware and/or software. In some embodiments, the method 300 is implemented by one or more components of FIG. 1 (e.g., automatic privilege assignor 102 of FIG. 1) and/or FIG. 8 (e.g., computer 801 of FIG. 8). In some embodiments, the method 300 is a sub-method of operation 212 of FIG. 2.

Operation 302 includes setting an object type according to the API definition. For example, the object type can be defined in an argument of the function using the API definition.

Operation 304 includes setting a verb using the API-to-verb mapping. In some embodiments, operation 304 identifies a function in source code, compares the function to the API-to-verb mapping, and retrieves a matching verb for the function in the API-to-verb mapping.

Operation 306 includes retrieving a subject of a binary program using the program-to-subject mapping. Operation 308 determines if an object location is null. If so (308: YES), then the method 300 proceeds to operation 310 and sets the object location as the location of the binary program (e.g., using runtime analysis). If not (308: NO), then the method 300 proceeds to operation 312 and sets the object location to be the location defined in the API definition.

After either operation 310 or 312, the method 300 proceeds to operation 314. Operation 314 includes iterating to a next API call in the source code. Accordingly, the method 300 can be repeated for each API call (e.g., function) in the source code.

Figure 4:
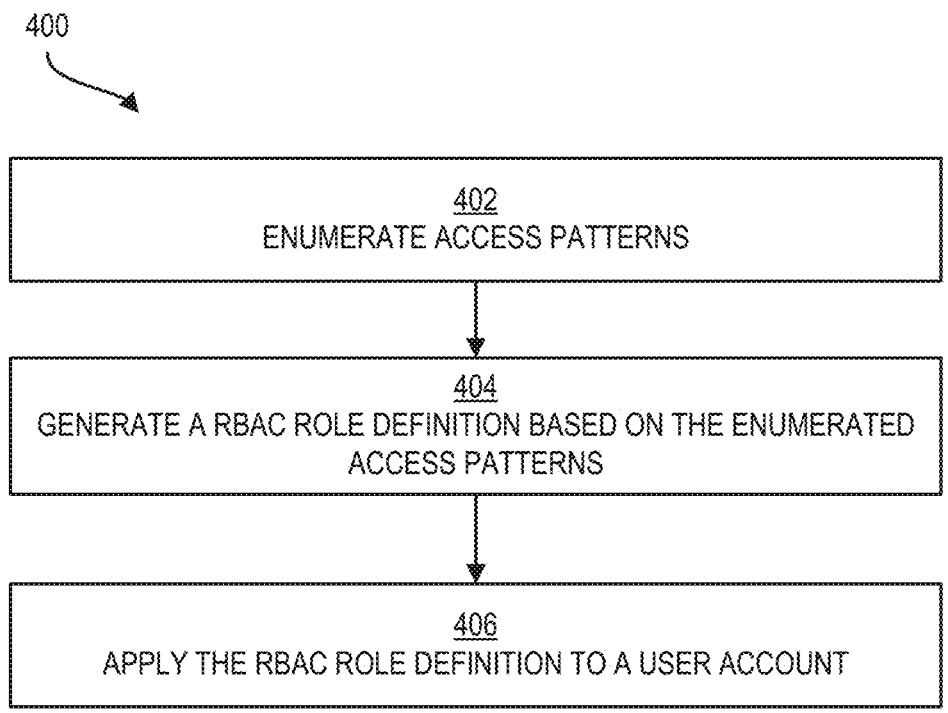
FIG. 4 illustrates a flowchart of an example method for enumerating access patterns in source code, in accordance with some embodiments of the present disclosure.

FIG. 4 illustrates a flowchart of an example method for enumerating access patterns in source code, in accordance with some embodiments of the present disclosure. In some embodiments, the method 400 can be implemented by a computer, a processor, or another configuration of hardware and/or software. In some embodiments, the method 400 is implemented by one or more components of FIG. 1 (e.g., automatic privilege assignor 102 of FIG. 1) and/or FIG. 8 (e.g., computer 801 of FIG. 8).

Operation 402 includes enumerating access patterns. In some embodiments, operation 402 includes enumerating access patterns including a subject, a verb, an object location, and an object type of respective API calls in source code associated with a binary program. For example, operation 402 can generate a first object type based on an API definition associated with the function call, a first verb based on an API-to-verb matching database, a first subject based on a program-to-subject mapping database and the binary program, and a first object location based on the API definition associated with the function call.

Operation 404 includes generating an RBAC role definition based on the enumerated access patterns. Operation 406 includes applying the RBAC role definition to a user account. In some embodiments, operation 406 includes the user account interacting with the source code and/or binary program using an endpoint device and under the constraints imposed by the RBAC role definition.

FIGS. 5, 6, and 7 illustrate example code snippets demonstrating how some aspects of the present disclosure are implemented in a KUBERNETES® application implemented on a KUBERNETES® API server, in accordance with some embodiments of the present disclosure. In code snippet 502, static analysis can be performed to find a function (e.g., "create") and determine its type (e.g., verb "write"). As shown in code snippet 502, the location (e.g., namespace in KUBERNETES®) can vary depending on the function. In this example, the name of the function "create" is specified in its second argument (e.g., ConfigMap). It contains a namespace in its ObjectMeta.Namespace variable.

As shown in code snippet 504, t28 is the return value of GetResultConfigMap (t27, t15, "error-msg":string, t18, t21, t24, t25, t26). As a result, it is necessary to trace GetResultConfigMap( ) In GetResultConfigMap( ) the return value is t10, and the ObjectMata.Namespace of t10 is t16 as shown in code snippet 506. As shown in code snippet 508, t16 is the pointer for t17.

Referring now to FIG. 6, as shown in code snippet 602, t17 is the return value of GetComplianceOperatorNamespace( ) Therefore, it is necessary to trace GetComplianceOperatorNamespace( ) As shown in code snippet 604, in GetComplianceOperatorNamespace( ) the return value is the variable ComplianceOperatorNamespace. The value of the variable ComplianceOperatorNamespace depends on the runtime situation as shown in code snippet 606.

Referring now to FIG. 7, as shown in code snippet 702, the runtime definition (e.g., pod resource for KUBERNETES®) shows the namespace is openshift-compliance (regardless of the return value of isRunModelLocal( ) in init( ) as shown in code snippet 606 of FIG. 6).

Collectively, FIGS. 5, 6, and 7 demonstrate the inefficient and error-prone nature of manual role definitions and illustrate the benefits of automating least privilege assignment as done by aspects of the present disclosure. Furthermore, FIGS. 5, 6, and 7 illustrate an actual implementation for retrieving a null object location using runtime analysis.

While FIGS. 5, 6, and 7 discussed an implementation on a KUBERNETES® application (e.g., pod) for a KUBERNETES® API server, other implementations are readily conceivable. For example, a PYTHON® script for a cloud API can be as follows. First, extract all HyperText Transfer Protocol (HTTP) calls (e.g., get( ) post( ) put( ) patch( ) delete( ) of a request module) and perform static analysis to extract API calls. For the extracted API calls: (i) determine object type from the path of the API address (e.g., POST/v1/clusters->clusters); (ii) use the X-Auth-Resource-Group header value of the call as an object location; and (iii) determine verb (e.g., "read" for "get( )" and "write" for other function calls). If the object location is null, a value of the X-Auth-Resource-Group in the request command can be used as the object location. A subject can be determined using the Authorization header value of the request command. Finally, JAVASCRIPT® Object Notation (JSON) data can be generated for input to a cloud Identity and Access Management (IAM) API request.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 8:
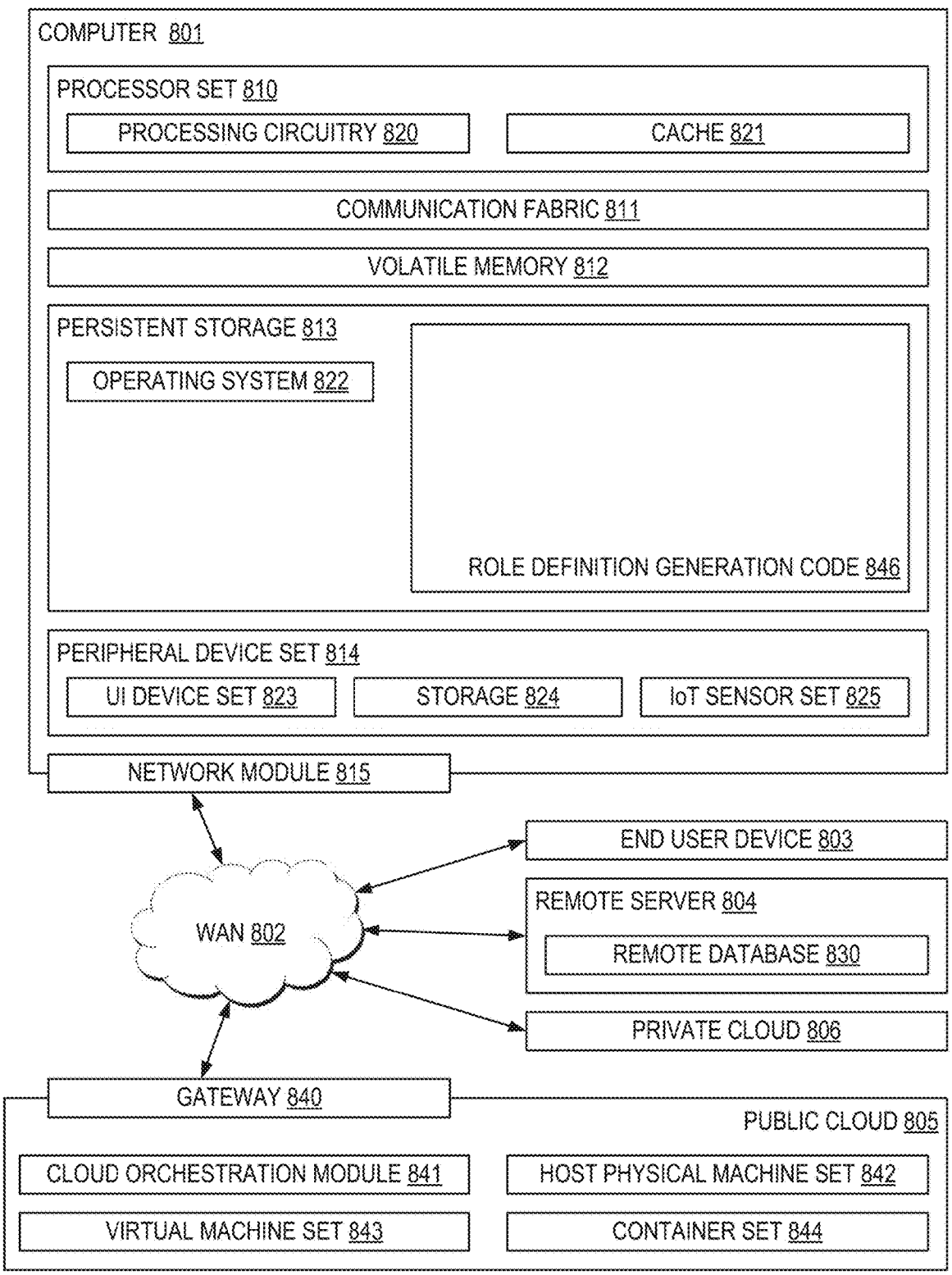
FIG. 8 illustrates a block diagram of an example computing environment, in accordance with some embodiments of the present disclosure.

FIG. 8 illustrates a block diagram of an example computing environment, in accordance with some embodiments of the present disclosure. Computing environment 800 contains an example of an environment for the execution of at least some of the computer code involved in performing the inventive methods, such as role definition generation code 846. In addition to role definition generation code 846, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and role definition generation code 846, as identified above), peripheral device set 814 (including user interface (UI), device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

Computer 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/ or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

Processor set 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in role definition generation code 846 in persistent storage 813.

Communication fabric 811 is the signal conduction paths that allow the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 812 is any type of volatile memory now known or to be developed in the future. Examples include dynamic type random access memory (RAM) or static type RAM. Typically, the volatile memory is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

Persistent storage 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface type operating systems that employ a kernel. The code included in role definition generation code 846 typically includes at least some of the computer code involved in performing the inventive methods.

Peripheral device set 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

Network module 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

Remote server 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

Public cloud 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any software configured to perform any portion of the methods described previously and/or implement any of the functionalities described previously) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding of the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a computer-implemented method. The method includes enumerating access patterns including a subject, a verb, an object location, and an object type of respective Application Programming Interface (API) calls in source code associated with a binary program, wherein for a first function call in the source code the method is configured to generate: a first object type based on an API definition associated with the function call; a first verb based on an API-to-verb matching database; a first subject based on a program-to-subject mapping database and the binary program; and a first object location based on the API definition associated with the function call; and generating a Role Based Access Control (RBAC) role definition based on the enumerated access patterns.

Example 2 includes the features of Example 1. In this example, the first object location is a null object location, and wherein the null object location is set to a location of a corresponding binary program using runtime analysis. Optionally, the null object location is provided as a command line argument. Optionally, the null object location is provided as an environmental variable.

Example 3 includes the features of any one of Examples 1 to 2, including or excluding optional features. In this example, the API calls in the source code include direct calls and indirect calls.

Example 4 includes the features of any one of Examples 1 to 3, including or excluding optional features. In this example, the first function call comprises a HyperText Transfer Protocol (HTTP) call. Optionally, the first object type is based on a path component of an API address. Optionally, the first object location is based on an X-Auth-Resource-Group header value. Optionally, the first subject is based on an Authorization header value of a request command. Optionally, the first verb is selected from a group consisting of: read for a get( ) function call, and write for a function call selected from a group consisting of: post( ) put( ) patch( ) and delete( ).

Example 5 includes the features of any one of Examples 1 to 4, including or excluding optional features. In this example, the first object location is based on a namespace.

Example 6 includes the features of any one of Examples 1 to 5, including or excluding optional features. In this example, the RBAC role definition is formatted, at least in part, as JAVASCRIPT® Object Notation (JSON) data.

Example 7 is a system. The system includes one or more computer readable storage media storing program instructions; and one or more processors which, in response to executing the program instructions, are configured to perform a method according to any one of Examples 1 to 6, including or excluding optional features.

Example 8 is a computer program product. The computer program product includes one or more computer readable storage media, and program instructions collectively stored on the one or more computer readable storage media, the program instructions comprising instructions configured to cause one or more processors to perform a method according to any one of Examples 1 to 6, including or excluding optional features.

Example 9 is a system. The system includes an Application Programming Interface (API) definition characterizing respective object types and object locations of respective API calls; an API-to-verb mapping database characterizing respective verbs of respective API calls; a program-to-subject mapping database characterizing respective subjects of respective API calls; and an automatic privilege assignor storing access patterns including a subject, a verb, an object location, and an object type of respective API calls in source code associated with a binary program, wherein the automatic privilege assignor is configured to generate a Role Based Access Control (RBAC) role definition based on the access patterns.

Example 10 includes the features of Example 9. In this example, the system further includes an endpoint hosting a first user account, wherein the first user account accesses the respective API calls in the source code associated with the binary program in compliance with the RBAC role definition.

Example 11 includes the features of any one of Examples 9 to 10, including or excluding optional features. In this example, a first object location is a null object location, and wherein the null object location is set to a location of the binary program using runtime analysis. Optionally, the null object location is provided as one selected from a group consisting of: a command line argument, and an environmental variable.

Example 12 includes the features of any one of Examples 9 to 11, including or excluding optional features. In this example, the object location is based on a namespace.

Example 13 includes the features of any one of Examples 9 to 12, including or excluding optional features. In this example, the respective API calls in the source code include direct calls and indirect calls.

What is claimed is:

1. A computer-implemented method comprising:
    training a machine learning model on historical datasets of Application Programming Interface (API) definitions, API-to-verb mappings, and program-to-subject mappings;
    inputting source code associated with a binary program into the machine learning model;
    outputting, from the machine learning model, access patterns including a subject, a verb, an object location, and an object type of respective API calls in the source code associated with the binary program, wherein for a first function call in the source code the machine learning model is configured to generate output:
    a first object type based on an API definition associated with the function call;
    a first verb;
    a first subject; and
    a first object location based on the API definition associated with the function call, wherein the first object location is a null object location, and wherein the null object location is set to a location of a corresponding binary program using runtime analysis;
    generating a Role Based Access Control (RBAC) role definition based on the access patterns:
    applying the RBAC role definition to a user account; and
    in response to the user account requesting access to the source code from an endpoint device, limiting access to the source code according to the RBAC role definition, wherein the RBAC role definition enforces access privileges determined from runtime analysis when an object location is null.

2. The method of claim 1, wherein the null object location is provided as a command line argument.

3. The method of claim 1, wherein the null object location is provided as an environmental variable.

4. The method of claim 1, wherein the API calls in the source code include direct calls and indirect calls.

5. The method of claim 1, wherein the first function call comprises a HyperText Transfer Protocol (HTTP) call.

6. The method of claim 5, wherein the first object type is based on a path component of an API address.

7. The method of claim 5, wherein the first object location is based on an XAuth-Resource Group header value.

8. The method of claim 5, wherein the first subject is based on an Authorization header value of a request command.

9. The method of claim 5, wherein the first verb is read for a get ( ) function call.

10. The method of claim 5, wherein the first verb is write for a function call selected from a group consisting of: post ( ) put ( ) patch ( ) and delete ( ).

11. The method of claim 1, wherein the first object location is based on a namespace.

12. The method of claim 1, wherein the RBAC role definition is formatted, at least in part, as JAVASCRIPT® Object Notation (JSON) data.

13. A computer program product comprising one or more computer readable storage media, and program instructions collectively stored on the one or more computer readable storage media, the program instructions comprising instructions configured to cause one or more processors to perform a method comprising:

training a machine learning model on historical datasets of Application Programming Interface (API) definitions, API-to-verb mappings, and program-to-subject mappings;

inputting source code associated with a binary program into the machine learning model;

outputting, from the machine learning model, access patterns including a subject, a verb, an object location, and an object type of respective API calls in the source code associated with the binary program, wherein for a first function call in the source code the machine learning model is configured to output:

a first object type based on an API definition associated with the function call;

a first verb;

a first subject; and a first object location based on the API definition associated with the function call, wherein the first object location is a null object location, and wherein the null object location is set to a location of a corresponding binary program using runtime analysis;

generating a Role Based Access Control (RBAC) role definition based on the access patterns;

applying the RBAC role definition to a user account; and in response to the user account requesting access to the source code from an endpoint device, limiting access to the source code according to the RBAC role definition, wherein the RBAC role definition enforces access privileges determined from runtime analysis when an object location is null.

14. The computer program product of claim 13, wherein the null object location is provided as a command line argument.

15. The computer program product of claim 13, wherein the null object location is provided as an environmental variable.

16. A system comprising:
one or more processors; and
one or more computer readable storage media storing program instructions which, when executed by the one or more processors, are configured to cause the one or more processors to perform a method comprising:

training a machine learning model on historical datasets of Application Programming Interface (API) definitions, API-to-verb mappings, and program-to-subject mappings;

inputting source code associated with a binary program into the machine learning model;

outputting, from the machine learning model, access patterns including a subject, a verb, an object location, and an object type of respective API calls in the source code associated with the binary program, wherein for a first function call in the source code the machine learning model is configured to output:

a first object type based on an API definition associated with the function call;

a first verb;

a first subject based; and a first object location based on the API definition associated with the function call, wherein the first object location is a null object location, and wherein the null object location is set to a location of a corresponding binary program using runtime analysis; generating a Role Based Access Control (RBAC) role definition based on the access patterns;

applying the RBAC role definition to a user account; and in response to the user account requesting access to the source code from an endpoint device, limiting access to the source code according to the RBAC role definition, wherein the RBAC role definition enforces access privileges determined from runtime analysis when an object location is null.

17. The system of claim 16, wherein the null object location is provided as a command line argument.

18. The system of claim 16, wherein the null object location is provided as an environmental variable.

19. The system of claim 16, wherein the API calls in the source code include direct calls and indirect calls.

20. The system of claim 16, wherein the first function call comprises a HyperText Transfer Protocol (HTTP) call, and wherein the first object type is based on a path component of an API address.

* * * * *